(12) United States Patent
Vijay et al.

(10) Patent No.: US 7,831,517 B1
(45) Date of Patent: Nov. 9, 2010

(54) SINGLE BINARY SOFTWARE LICENSE DISTRIBUTION

(75) Inventors: Shyam Sunder Vijay, Fremont, CA (US); Digby Grant Horner, San Jose, CA (US); Xuejun Xu, Cupertino, CA (US); Li-qian Liu, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 698 days.

(21) Appl. No.: 11/585,715

(22) Filed: Oct. 24, 2006

(51) Int. Cl.
*G06F 21/00* (2006.01)
*H04L 9/32* (2006.01)

(52) U.S. Cl. .................................. 705/59; 713/170
(58) Field of Classification Search ............... 705/1–79; 713/170
See application file for complete search history.

(56) References Cited

U.S. PATENT DOCUMENTS

| | | | | |
|---|---|---|---|---|
| 5,438,508 A * | 8/1995 | Wyman | ........................ | 705/8 |
| 6,581,044 B1 * | 6/2003 | Alur | ........................... | 705/59 |
| 7,260,557 B2 * | 8/2007 | Chavez | ........................ | 705/59 |
| 2002/0114466 A1 * | 8/2002 | Tanaka et al. | ................ | 380/232 |
| 2002/0138441 A1 * | 9/2002 | Lopatic | ........................ | 705/59 |
| 2002/0165826 A1 * | 11/2002 | Yamamoto | .................... | 705/59 |
| 2002/0194477 A1 * | 12/2002 | Arakawa et al. | ............. | 713/170 |
| 2003/0004888 A1 * | 1/2003 | Kambayashi et al. | ......... | 705/59 |
| 2004/0039916 A1 * | 2/2004 | Aldis et al. | ................. | 713/177 |
| 2004/0249762 A1 * | 12/2004 | Garibay et al. | ................ | 705/59 |
| 2005/0289072 A1 * | 12/2005 | Sabharwal | .................... | 705/59 |
| 2006/0059100 A1 * | 3/2006 | Ronning et al. | ............... | 705/59 |
| 2006/0059561 A1 * | 3/2006 | Ronning et al. | ............... | 726/26 |
| 2006/0265758 A1 * | 11/2006 | Khandelwal et al. | .......... | 726/27 |
| 2008/0133324 A1 * | 6/2008 | Jackson et al. | ................ | 705/10 |

* cited by examiner

*Primary Examiner*—Andrew J. Fischer
*Assistant Examiner*—Murali Dega
(74) *Attorney, Agent, or Firm*—Chapin IP Law, LLC; Barry W. Chapin, Esq.

(57) ABSTRACT

A system receives a serial number for software to be installed on a computer system and decodes the serial number to identify a license type associated with the software. The system obtains a license configuration corresponding to the license type associated with the software and communicates with a licensing server based on the license configuration for production of an authorization code to allow operation of the software on a computer system. The system receives an authorization code from the licensing server allowing operation of the software on the computer system.

31 Claims, 5 Drawing Sheets

SINGLE BINARY SOFTWARE LICENSE DISTRIBUTION

BACKGROUND

Users of modern software applications may obtain access to operation of such applications using a variety of mechanisms. For example, a person may visit a retail store and purchase software on a storage medium such as a CD-ROM for installation within a computer system, or a user may download a copy of the software for installation within a computer system. In most cases, purchase of software entails a purchase of a corresponding software license that provides a respective user a legal right to download, install, and/or otherwise operate the purchased software application. In some cases, users do not actually own the software code itself, but rather purchase a license to operate the software in executable form.

For example, in a retail setting, a respective user can purchase a CD-ROM (Compact Disk Read Only Memory) or other type of storage media that is encoded with a software program for installation onto a respective computer system owned by the user. Such a CD-ROM can include an associated serial number packaged with the CD-ROM. The serial number provided by the vendor enables a user to perform an installation procedure of the software and allows operation of the software application stored on the CD-ROM within the computer system on which the software is installed. As an alternative to obtaining the software from a retail vendor, a user may download software over a network such as the Internet from a remote server. The user can then execute an installation program that comes with the downloaded software that then installs the software onto the computer. During purchase over the network, a user may be provided with a serial number or other authorization code that must be entered when installing the software to allow proper operation of the software on the computer. The serial number thus acts as a key to unlock the use of the software. If a user enters an incorrect serial number, the software may not install properly or may not operate once installed.

As an example, when downloading or attempting to execute the software program, a respective installer program for installing the software application on the user's computer system may require the user to input the correct serial number associated with the CD-ROM or provided to the user (i.e. from a server) when downloading the program. Upon receipt of the serial number by the installer program, the installer program may send the serial number over a network such as the Internet to a server managed by the vendor of the software program being downloaded. In general, the vendor's server uses the serial number to track and identify which specific copy of the software application is being downloaded and installed for operation onto a respective user's computer system.

In addition to the serial number, the vendor's server may require further input (e.g., a user's, name, address, business, email address, etc.) from a respective user to register and/or install the software program for use. After obtaining such information from the user, the server typically provides an authentication code enabling the respective user to install and/or execute the software program on the user's computer system.

SUMMARY

Conventional techniques for distributing software licenses and installing conventional software suffer from a number of deficiencies. In particular, some vendors of conventional software provide different versions of a program to different end users. For example, a retail version of a particular software program may contain only certain features in the actual binary code of the retail version of the software that a retail user installs and operates on his or her computer system, whereas a professional version of the same program may be available for purchase by different customers such as commercial end users that is coded with additional features not present in the binary version of the retail program. Conventional software vendors must therefore produce two versions of the same general application to ship to different end users (e.g. a retail version and professional version). This can be problematic since a software vendor must mange aspects such as maintaining separate inventories of the different binaries (i.e. executables) for the different versions of the application.

Techniques discussed herein significantly overcome such software distribution and licensing drawbacks and deviate with respect to conventional applications such as those discussed above as well as additional techniques also known in the art.

Embodiments described herein disclose a system allowing distribution, installation and access to software licenses based on encoding license information within a serial number assigned to the software. By encoding a license type associated with the software into the serial number assigned to the software, configurations disclosed herein allow a single binary executable of the software to be created that is able to interpret and decode the serial number to determine a license type to be associated with that particular instance of the software. Based on the license type, the software can then obtain a proper associated license configuration that corresponds to the serial number of the software. The license configuration can indicate, for example, an identity of the particular license server that is to serve authorization codes or licenses for operation of that instance of the software as well as license rights for specific features of the software product for certain types of licenses. If the serial number indicates, for example, that the software is to be associated with a retail license configuration, the software can obtain such a retail license configuration from a distribution CDROM or other media that included the software itself. On the other hand, if the serial number indicates a volume license configuration (of which there may be several types), a purchaser of volume licenses can configure the volume license configuration to specify a specific location of a license server.

The volume license configuration may be configured with a location, such as a Uniform Resource Locator, of either a vendor-based volume license server that operates over a public computer network such as the Internet to serve vendor licenses to installed instances of the software, or alternatively, a user can modify the licensing configuration to identify a remote or customer-based license server computer system operated by the customer who uses the software that will serve customer-based licenses for operating instances of the software over a private network such as the customer's corporate network. Once the software has obtained the proper license configuration, the software can perform a fingerprint operation of the computer system into which it is installed to produce a unique fingerprint of the computer system. The software can then communicate with the license server to transfer the fingerprint, the serial number and information from the license configuration in order to obtain an authorization code (i.e. a license or token) that allows the software to operate on the computer system in which it is installed.

By allowing the serial number to include an encoding of the license type, and by enabling a license configuration to be obtained by the software based on the serial number, the vendor of the software configured in accordance with embodiments disclosed herein is able to create a single binary no matter who the end-user of the software turns out to be. For example, a retail customer can purchase the same binary as a commercial customer, but the combination of the serial number and licensing configuration will determine how that same binary will operate differently for each end user. This avoids the vendor of the software having to create separate binary executable images for different versions (e.g. retail version versus professional version) of the software. It is to be understood that software to which the licensing and distribution systems explained herein apply may be any type of software including one of more application programs, a group of processes, and all related files, data and configuration information. That is, the term software as used herein is meant to be general in nature and refer to any type of executable program or non-executable digital content that may be distributed and installed within a computer system or other type of computerized device (e.g. cell phone, personal digital assistant, dedicated computerized device such as a switch, router or network device) and the like. Further details of embodiments disclosed herein will now be provided with respect to the accompanying figures and detailed description that follow.

More specifically, in one embodiment, the software is installed and operates (e.g. executes) to receive a serial number for software. The software decodes the serial number to identify a license type associated with the software. The software then operates to obtain a license configuration corresponding to the license type associated with the software. The license configuration can be obtained from different sources, depending upon the type of license. As an example, the software may determine that the serial number identifies that the software is associated with a retail license type and in response, obtains a retail license configuration for use with the software from the CDROM from which the software is installed. Alternatively, the software may determine that the serial number identifies that the software is associated with a volume license type and in response, obtains a volume license configuration for use with the software from a volume distribution package created by an IT administrator.

In one retail configuration, the software obtains the retail license configuration locally from removable local storage media such as a CDROM, flash memory, disk, tape or other removable media inserted into a locally installed and operating peripheral storage device such as a CRROM drive or memory card reader of the computer system onto which the software to be operated. The local storage media is the same media that includes a binary of the software itself. The retail license configuration specifies a vendor license server with which to communicate with over a public network such as the Internet for production of an authorization code.

For a volume licensing configuration, the customer can specify that licenses are either served remotely from the vendor license server, or locally from an in-house customer or local license server. In such cases, the software receives a modification to the volume license configuration to include a network identity of a local or customer license server that operates locally within a customer network of a customer that purchased volume licenses for the software. The local license server provides authorization codes for operation of installations of software operating within the customer network.

Once equipped with the proper license configuration, the software communicates with a licensing server based on the license configuration for production of an authorization code to allow operation of the software on a computer system. The serial number, in combination with the license configuration information allows for a single binary of the software to determine what type of licensing is to be instituted. The software then receives an authorization code (i.e. a license to operate) from the licensing server. The authorization code allows operation of the software on the computer system. In this manner, the serial number allows a single binary to determine what type of licensing is to be instituted, and therefore allows the software to obtain the appropriate license configuration from a proper license server location.

Embodiments disclosed herein also include a configuration of one or more computerized devices, workstations, handheld or laptop computers, or the like to carry out and/or support any or all of the method operations disclosed herein. In other words, one or more computerized devices, computer systems, controllers or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, provides one or more processes that program the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for supporting operations such as distribution of software licenses. Other embodiments of the present application include software programs to perform any of the method embodiment steps and operations summarized above and disclosed in detail below.

As discussed above, techniques herein are well suited for use in distribution of software licenses. However, it should be noted that embodiments herein are not limited to use in such applications and that the techniques discussed herein are well suited for other applications as well. Note that each of the different features, techniques, configurations, etc. discussed herein can be executed independently or in combination and via a single software process on in a combination of processes, such as in client/server configuration.

It is to be understood that the system herein can be embodied strictly as a software program or application, as software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

Additional features of the embodiments herein will be further discussed in the Detailed Description section of this application and accompanying figures and the aforementioned summary is not intended to limit the scope of the invention.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Embodiments described herein disclose a system and allowing distribution, installation in access to software licenses based on encoding license information within a serial number assigned to the software. By encoding a license type associated with the software into the serial number assigned to the software, configurations disclosed herein allow a single binary executable of the software to be created that is able to interpret and decode the serial number to determine a license type to be associated with that particular instance of the software. In other words, the combination of the serial number and the information from the license configuration file provides the mechanisms to allow a single binary for the software that can be used for many different types of licensing.

Based on the license type, the software can then obtain a proper associated license configuration that corresponds to the serial number of the software. The license configuration can indicate, for example, an identity of the particular license server that is to serve authorization codes or licenses for operation of that instance of the software. If the serial number indicates, for example, that the software is to be associated with a retail license configuration, the software can obtain such a retail license configuration from a distribution CDROM or other media that included the software itself. On the other hand, if the serial number indicates a volume license configuration (of which there may be several types), a purchaser of volume licenses can configure the volume license configuration to specify a specific location of a license server.

The volume license configuration may be configured with a location, such as a Uniform Resource Locator, of either a vendor-based volume license server that operates over a public computer network such as the Internet to serve vendor licenses to installed instances of the software, or alternatively, a user can specify a location of a local licensing server (e.g. to a portal when obtaining the licensing configuration file) and the licensing configuration is produced (e.g., by the licensing portal) and is encoded with an identifications of the customer-based local license server computer system operated by the customer who uses the software that will serve customer-based licenses for operating instances of the software over a private network such as the customer's corporate network.

Once the software has obtained the proper license configuration, the software can perform a fingerprint operation of the computer system into which it is installed to produce a unique fingerprint of the computer system. The software can then communicate with the license server to transfer the fingerprint, the serial number and information from the license configuration in order to obtain an authorization code (i.e. a license or token) that allows the software to operate on the computer system in which it is installed.

By allowing the serial number to include an encoding of the license type, and by enabling a license configuration to be obtained by the software based on the serial number, the vendor of the software configured in accordance with embodiments disclosed herein is able to create a single binary no matter who the end-user of the software turns out to be.

For example, a retail customer can purchase the same binary as a commercial customer, but the combination of the serial number and licensing configuration will determine how that same binary will operate differently for each end user. This avoids the vendor of the software having to create separate binary executable images for different versions (e.g. retail version versus professional version) of the software. It is to be understood that software to which the licensing and distribution systems explained herein applies may be any type of software including one of more application programs, a group of processes, and all related files, data and configuration information. That is, the term software as used herein is meant to be general in nature and refer to any type of executable program that may be distributed and installed within a computer system or other type of computerized device (e.g. cell phone, personal digital assistant, dedicated computerized device such as a switch, router or network device) and the like.

As another example, in addition to the retail and volume license types noted above, another category of license type supported by embodiments disclosed herein is called a "trial license." The single binary solution disclosed herein also provides the ability to create and use a single binary as a software product tryout that comes in two variants of a trial license. The first is called a "try and die" which means the software works for a given number of days (encapsulated in the License Configuration data) and then ceases functioning. The second variant adds a "buy" capability, where the user can buy a permanent license, thereby converting the trial license to a "perpetual" license. The software includes the ability to make the purchase transaction from within the product, without the need to buy it separately and install it again. The existing "trial" license is converted to a "perpetual" license when the purchase transaction is successfully completed.

If the serial number indicates the license is for a trial license, the license configuration obtained also includes details for the trial license, in addition to details for retail license, volume license, etc. (should a different serial number be provided). Accordingly, in an example shipping software product, the default license types and license configuration files shipped on a CD-ROM may be, for example, a retail license and a trial license. It is to be understood that a particular software product may only offer a certain license type (or subset of all available license types), such as the trial only as a "try and die" while other products may provide a "try and buy" capability.

In an alternative configuration, the serial number could include an encoded license type called "tryout", in addition to Retail or Volume. The tryout license type can allow a single binary of the software to use the part of the software that provides tryout functionality only with limited features. Since the software vendor does not need to give unique tryout serials numbers for every end user (since those users are merely going to use the product as a tryout, which is NOT activatable), the vendor can provide one common serial number with the "tryout" attribute set in it and "pre-set" this serial number for use by the software. When the user chooses "tryout" as their option during software installation, this pre-installed serial number is used to install the product.

Figure 1:
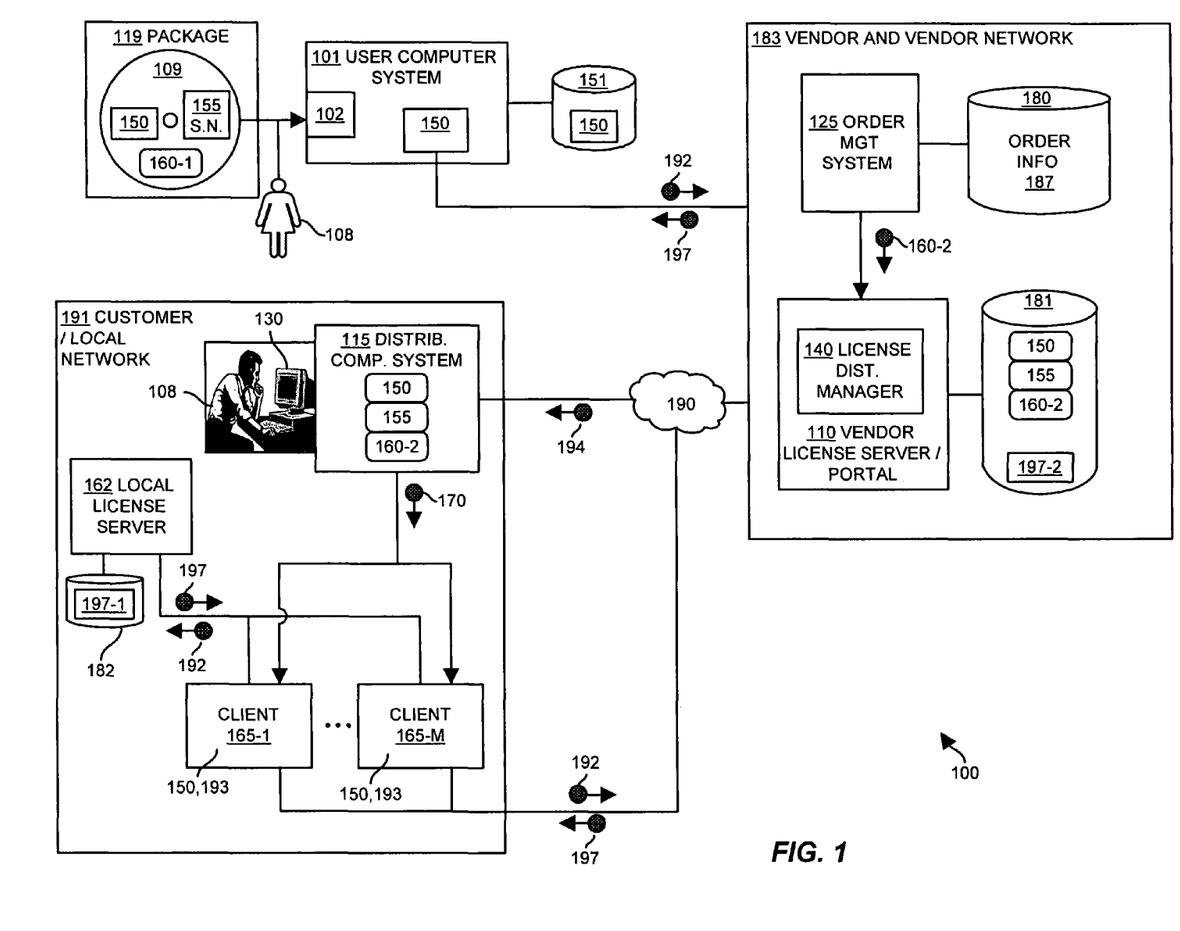
FIG. 1 is a diagram of a computer network environment enabling purchasing of software licenses and selection of distribution methods according to embodiments herein.

FIG. 1 is a diagram of a computer network environment 100 supporting distribution of software licenses according to embodiments herein. The computer network environment 100 illustrated in FIG. 1 shows a system for distribution, installation and operation of software and corresponding software licenses using several different licensing models for configurations including retail and volume licensing configurations and other types of licensing models.

For example, to illustrate retail license configurations, the computer network environment 100 in FIG. 1 includes a user computer system 101 into which software 150 is distributed, installed and licensed according to a retail license configuration as explained herein. The user computer system 101 includes a local peripheral storage device 102 such as a CD ROM drive or other type of storage device that can receive and access (e.g. read from and/or write to) removable media 109 such as a CD ROM (readable and/or writable) that is locally inserted into the local peripheral storage device 102 during operation of the user computer system 101. The media 109 is encoded with software 150 (e.g., an executable or binary program or application and set of files or other data associated therewith) to be installed for operation within the user computer system 101. The media 109 is further encoded with a retail license configuration 160-1 that is specifically designed for purposes of obtaining a retail license for operation of the software 150 in a retail configuration. A user 108 such as a consumer may, for example, purchase the removable media 109 in the package 119 in a store or other retail establishment. The removable media 109 includes (i.e., is purchased with) an associated serial number 155. As an example, the serial number 155 may be printed on the removable media 109 in a visible manner or, alternatively, may be contained within or printed on packaging 119 in which the removable media 109 is contained at purchased time. Alternatively, upon purchase, the vendor may electronically supply the serial number.

Once the retail user 108 installs the software 150 into the computer system 101 as will be explained shortly, the software 150 can send a request 192 to a vendor license server computer system 110 operated by the vendor 183 of the software (or operated by some other entity on public network 190 such as the Internet) to obtain an authorization code 197 (i.e. a retail license) that allows operation of the software 150 in a retail configuration on the user computer system 101. It is to be understood that obtaining software 150 on removable media 109 is one example of a technique that the user 108 can perform to obtain the software 150 for use on the user computer system 101 in a retail configuration. In alternative configurations, the entire contents of the media 109, including the software 150 and the retail license configuration 160-1 and any other data can be downloaded over the network 190 such as the Internet from the vendor computer system server 110 shown in FIG. 1.

During installation and operation of the software 150, the software 150 executes, runs, is interpreted or otherwise performs within the user computer system 101 and may be persistently stored for future access within local persistent storage 151, such as a hard disk drive or other storage media 151 coupled to or contained within the user computer system 101. The storage into which the software 150 is installed may be local or remote (e.g. networked). As also shown, the user computer system 101 couples to, and is in communication with, a public network 190 such as the Internet which in turn couples to, and is in communication with, a vendor managed licensing system 183. Interaction between the user computer system 101 and the vendor managed licensing system 183 for purposes of obtaining a retail license will be explained shortly.

The computer network environment 100 further illustrates and includes a local area network 191 such as customer corporate network that is illustrated in this example for purposes of explaining distribution, installation and operation of software when performed according to one or more volume or other license configurations as explained herein. In the example customer local area network 191 (customer network or local network), a user 108 such as an Information Technology (IT) manager or administrator user interoperates with a display screen 130 coupled to a distribution computer system 115. The local network 191 also includes, in this example, an optional local or customer-based licensing and distribution server 162 including local license storage 182, and client, end-user or customer computer systems 165 (e.g., client 165-1, client 165-2, client 165-3, . . . , client 165-M) onto which the software 150 can be distributed and installed in a volume license configuration as will be explained.

The vendor management licensing system 183 (generally referred to herein as the vendor 183) includes an order management system 125, a repository 180 for storing order information 187, a vendor licensing server computer system 110 that executes a vendor license distribution manager 140 (e.g. a server portal), and a repository 181 for storing volume license configurations 160-2 and to track authorization codes 197 (i.e. licenses) for specific customer computer systems 165 (and for retail licenses for retail computers 101) that have purchased licenses 197 of the software 150 from the vendor of the software and that are configured to have such licenses 197 served from the vendor licensing server computer system 110. Depending upon the configuration, the authorization codes 197 can either be sent directly to customer computer systems 165 or to a local license server 162 depending upon which license management technique is used, as explained herein.

Generally, in volume license configurations, the information technology user 108 (or a purchasing manager associated with the customer) places an order (e.g. either via a purchasing web site or portal, or by telephone) to the order management system 125 of the vendor 183 for some number of operable copies of software 150 to be configured in a volume license configuration. For example, the administrator user 108 who operates the local network 191 might order one hundred copies of the software 150 to be distributed, installed and licensed according to a volume licensing configuration as explained herein. The vendor 183 translates this order 151 into a volume licensing configuration 160-2 (e.g. a file) associated with the software 150. The volume license configuration 160-2 may be a file that indicates, for example, an identity of the customer 191, an identity of the software 150 (e.g. what specific application or product has been purchased), what specific features of the software 150 were purchased (e.g. are to be enabled upon installation and operation within customer computer systems 165), a default identity of a license server 110 to access to obtain an authorization code 197 to allow operation of the software 150, as well as other information. Once the vendor 183 has created the volume licensing configuration 160-2 for the software 150 purchased by the customer 191, the administrator user 108 is able to download 194 or otherwise electronically (or physically on media) obtain, into the distribution computer system 115, the software 150, the volume licensing configuration 160-2, and the serial number 155 associated with the purchase order 151 (transfers shown as 194 in FIG. 1). This may be done, for example, but having the administrator user 108 visit a licensing portal web site 140 provided by license distribution manager 140 that allows the administrator user 108 to review and download 194 orders placed for software 150.

In one configuration, the administrator user 108 is able to indicate, to the license distribution manager 140, for a particular set of purchased licenses (e.g. the one hundred license for a particular software product sold by the vendor), how many licenses are to be served from a vendor license server computer system 110 over public network 190 such as the Internet, as well as how many licenses of the purchased order are to be served locally from a local license server computer system 162 operating within the local network 191 of the customer. In other words, the system described herein allows an order of software licenses 197 (i.e. authorization codes) to be served from either a vendor licensing server 110 or from a local or customer licensing server 162. If any licenses 197 are to be served from the customer license server computer system 162, the administrator user 108 must "charge" up or download license information into that local licensing server 162 for storage within the local license storage 182. Details of configuring local and remote license servers are explained in co-pending patent application entitled "License Distribution" filed Oct. 24, 2006, Ser. No. 11/587,734. The entire contents of this co-pending patent are hereby incorporated by reference in their entirety.

Further details of operation of the licensing and software distribution system explained herein will now be provided with respect to flowcharts of processing steps performed by embodiments disclosed herein.

Figure 2:
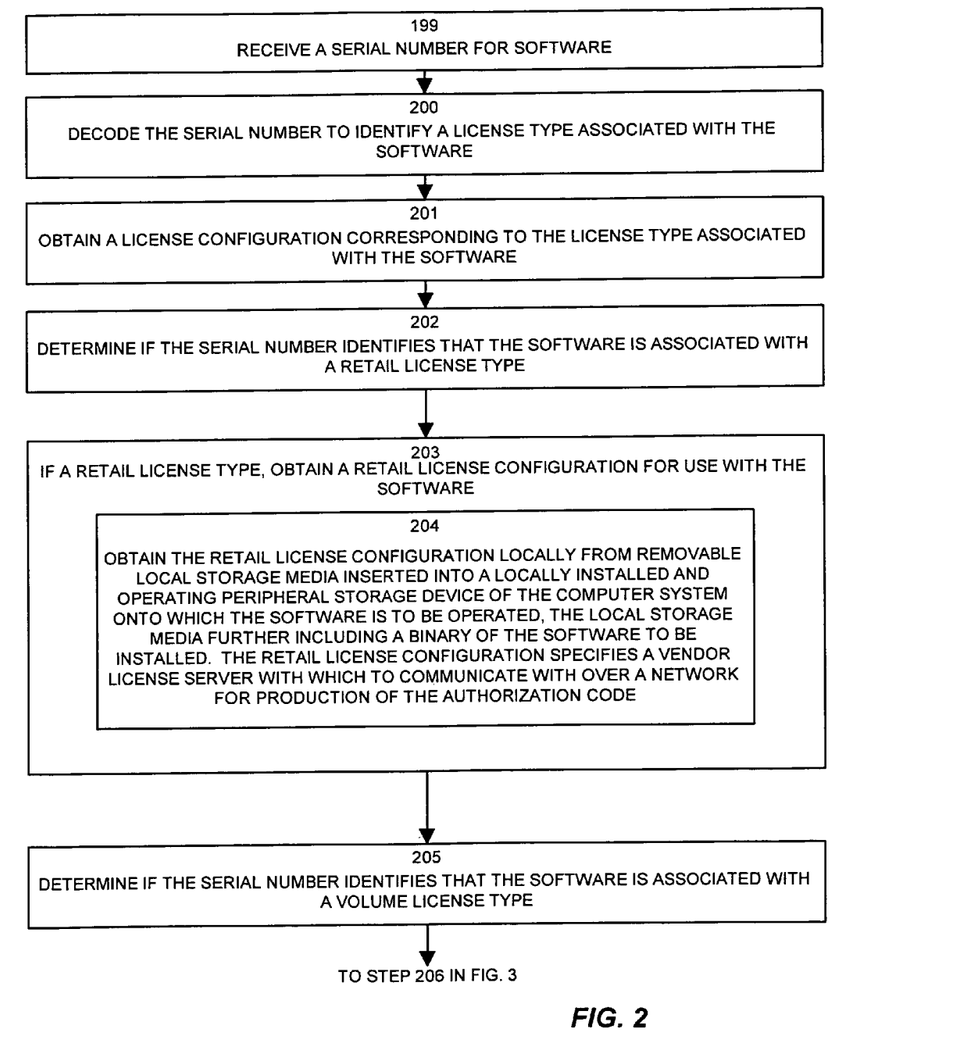
FIGS. 2 through 4 are a flowchart illustrating a general technique enabling distribution of software and licenses according to embodiments herein.

FIG. 2 is a flowchart of processing steps that software 150 configured in accordance with embodiments of the invention performs to obtain a license for proper operation regardless if the software 150 is configured in a retail or volume license distribution.

In step 199, the software 150 receives (e.g. via user or script input) a serial number 155 associated with the software 150. The serial number 155 in embodiments disclosed herein includes an encoding of a license type to be assigned to the software 150. As an example, if the vendor 183 of the software provides pre-packaged (e.g. shrink wrapped) boxes of the software for distribution in retail software stores (e.g. office supply stores, department stores or the like), the serial numbers 155 the vendor 183 generates and assigns to those particular copies of the software will have an encoding that indicates that those copies of the software are to be configured in a retail configuration (i.e. with features of the software to be enabled that are associated with a typical retail configuration). The serial number may be, for example, a 24 digit alphanumeric string that the software 150 itself can decode to determine the specific license distribution technique (e.g. retail, volume, other) as well as other information. As an example, the serial number 155 can further include (i.e. encode) other information about this particular distribution copy of the software 150, such as the product name and identity of the software, an operating system type and version upon which the software is designed to execute (e.g. Unix, windows, MacOS, etc.), a geographic region to which the software was distributed (e.g. Europe, North America, etc.), a version number and release date of the software, and other information. The serial number may be decodable by a process such as a hash function, and may or may not be understandable (i.e., mentally decodable) visually by a person looking at the serial number.

In step 200, the software 150 decodes the serial number 155 to identify a license type associated with the software 150. The decoding process can be any type of analysis, hash function, interpretation or other processing applied to the serial number 155 to determine the license type. License types can vary from retail licenses to volume licenses of several types, to other license types such as VIP licensing or special licensing or even no licensing. By encoding the licensing type to be applied to the software into the serial number, this can be interpreted by the software 150 itself which can then take appropriate action during operation to configure itself for features associated with that license type. This allows a single binary executable to be produced for the software 150 regardless of the licensing model to be used with the software and regardless of the features of the software to be enabled or not for users, instead of requiring the vendor of the software from having to create, distribute and track separate binary versions of the software for enablement of different features for different users having different licenses.

In step 201, the software 150 obtains a license configuration 160 corresponding to the license type associated with the software. As explained, based on the license type encoded within the serial number assigned to the software, the software 150 is able to obtain a specific license configuration from a specific location.

Figure 3:
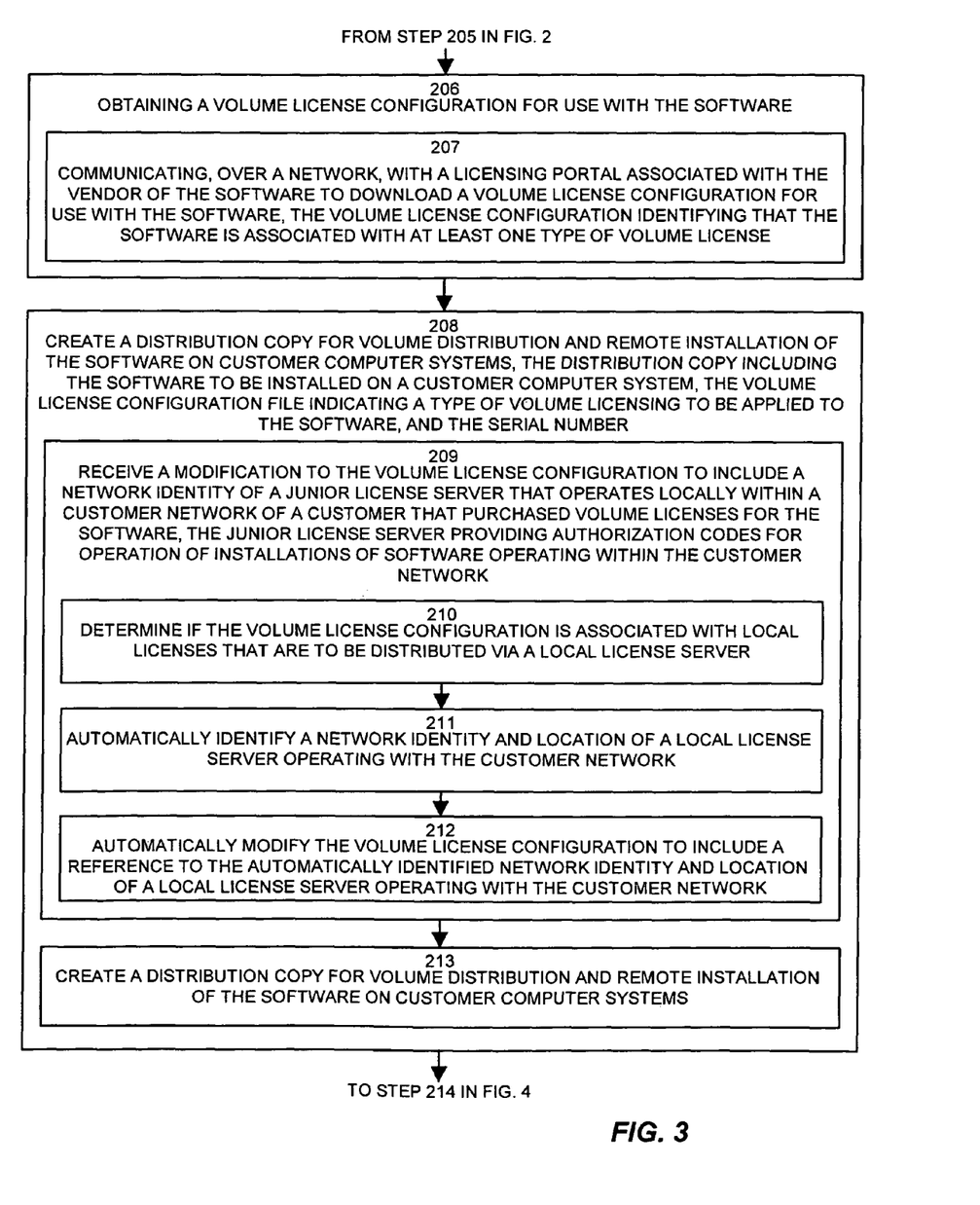
Figure 4:
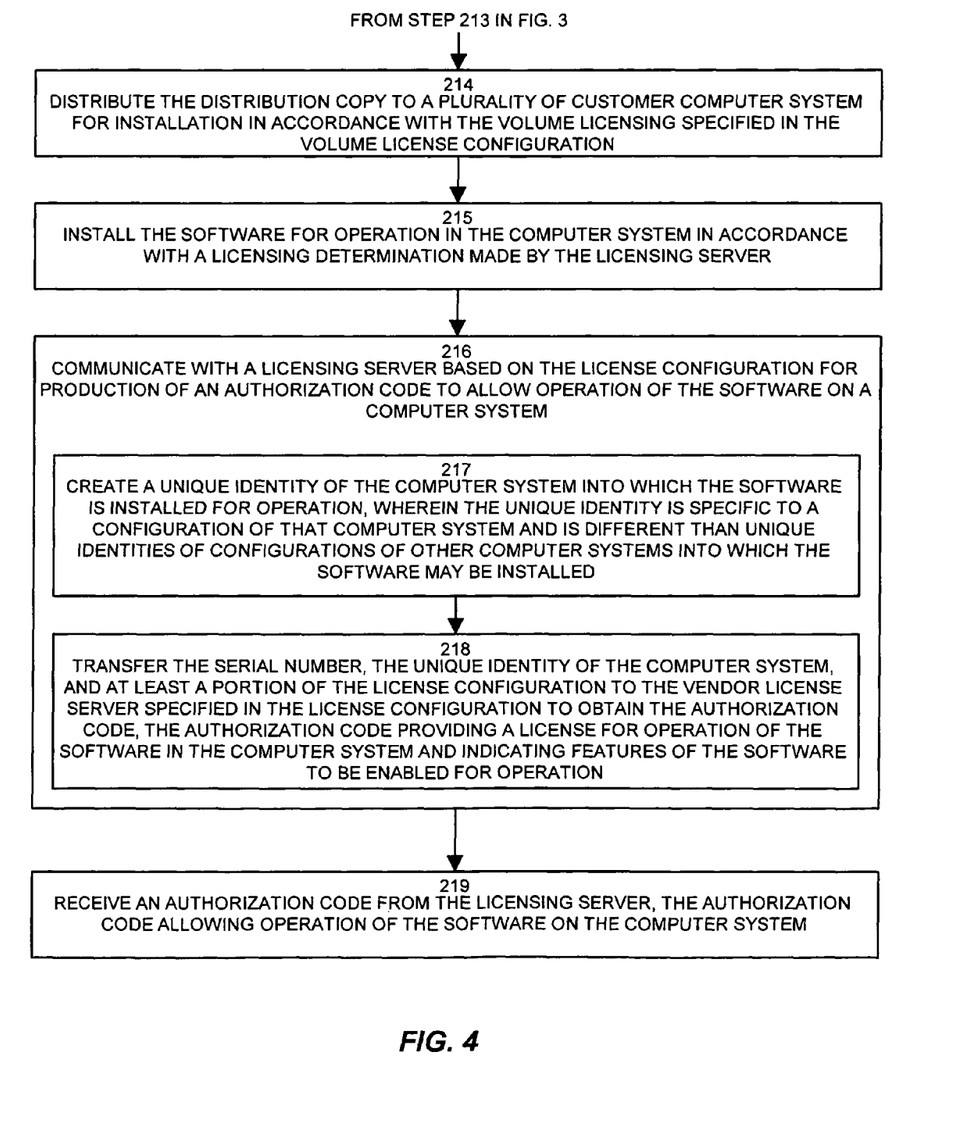

Steps 202 through 204 show processing for retail license types, whereas steps 205 through 214 show processing for volume licensing. Thereafter, the remaining steps are applicable to all types of licensing.

In step 202, the software 150 determines that the serial number 155 identifies that the software 150 is associated with a retail license type. As explained above, the serial number includes an encoding of the license type.

In step 203, in response to determining that the serial number identifies that the software is associated with a retail license type, the software 150 obtains a retail license configuration 160-1 for use with the software. For example, if the license type is retail, then the software uses a license configuration file 160-1 encoded onto the distribution media 109 such as a CDROM as shown in step 204 below.

In sub-step 204, the software 150 obtains the retail license configuration 160-1 locally from removable local storage media 109 inserted into a locally installed and operating peripheral storage device 102 of the retail user computer system 101 onto which the software to be operated, the local storage media further including a binary of the software to be installed, the retail license configuration specifying a vendor license server with which to communicate with over a network for production of the authorization code.

Steps 205 through 214 explain details of processing for volume licensing.

In step 205, the software 150 determines that the serial number 155 identifies that the software is associated with a volume license type. If the license type is volume, the administrator user 108 has obtained (e.g. downloads) a volume license configuration 160-2 (e.g. as a file) along with the download 194 of the software 150 from a web site 140 hosted, for example, in the license manager computer system 110 from the vendor of the software. This download 194 can include, as part of the software 150, a set of software tools that allow the administrator user 108 to prepare a distribution copy 170 of the software to be sent for installation of the software 150 (i.e. the application) to each of the client computers 165 on which the software 150 is installed. Software tools are available from the vendor 183 of the software for preparation of the distribution copy 170. In one configuration, this distribution copy 170 includes the software 150, the volume licensing configuration file 160-2, and an identity of the serial number 155 and a utility to perform self-installation on an end-user computer 165. This distribution copy 170 or package can thus be configured to be self-installing on computers 165, so that end users of the computer systems 165 do not need to be involved with the installation of the software 150. The install can thus take place, for example, at night when users are not operating the computer systems 165.

In step 206, in response to determining that the serial number identifies that the software is associated with a volume license type, the software 150 obtains a volume license configuration 160-2 for use with the software.

In sub-step 207, the software 150 (e.g. a tool operating on the distribution computer system 115 that is used to build the distribution copy 170) communicates 194 (e.g. downloads), over a network 190, with a licensing portal associated with the vendor of the software 150 to obtain a volume license configuration 160-2 for use with the software. The volume license configuration 160-2 identifies that the software 150 is associated with at least one type of volume license. The volume license configuration 160-2 may specify, for example, that local volume licenses 197-1 are to be served for this software 150 from a local license server 162 operating within a private network 191 of a customer 191 that purchased volume licenses for the software 150. In another configuration, the volume license configuration 160-2 may specify that remote volume licenses 197-2 are to be obtained from a remote public or vendor license server 110 operating within a public network 190 such as the Internet. In yet another configuration, the volume license configuration 160-2 may specify special or VIP volume licenses that do not require the software to communicate with a license server to allow operation of the software. The licenses 197 specified to be obtained using volume license configuration 160-2 may be a seat licenses, floating licenses, time expiring licenses, user specific licenses, feature specific licenses, and so forth. It is to be understood that any type of licensing can be specified to be obtained using the volume licensing configuration 160-2.

Generally, the license configuration 160 contains an encoding of the features a customer bought with the software, as well as a license server identity, and some editable fields that IT managers may want to use, such as messages for end users. The license configuration 160 can also indicate if installations are to be silent. In volume license situations, editable data is collected for the volume license configuration 160-2 by the license portal 110 which then prepares the volume license configuration 160-2. Once prepared, the volume license configuration 160-2 can be downloaded by the IT manager user 108. An example license configuration file format 160-2 is shown below along with various associated fields:

| Major Element | Sub Element | Sub Element | Sample Value | Editable |
|---|---|---|---|---|
| AdobeConfigVersion | | | 1.2 | No |
| UserPreferences | | | | |
| | LicenseDownloadOptions | | Verbose | Yes |
| | SendHostName | | true | Yes |
| LicenseServers | | | | |
| | Description | | Desc | Yes/No |
| | ServerURL | | port@host | Yes/No |
| | Signature | | | No |

-continued

| Major Element | Sub Element | Sub Element | Sample Value | Editable |
|---|---|---|---|---|
| LicenseInfo | | | | |
| | LicenseServerHostingModel | | InHouse | No |
| | DistributionModel | | Retail | No |
| | Licensee | | IBM | No |
| | LicenseeID | | IBM_ID | No |
| | EntitlementData | | | |
| | | LicenseModel | PerSeat | No |
| | | ProductIdentifier | 67 | No |
| | | TrialASR | Data | No |
| | | ActivationGraceASR | Data | No |
| | | RepairASR | Date | No |
| | | PhoneASR | Data | No |
| | | LicenseDataBlock | Data | No |
| | | EntitlementId | Acrobat-8 | No |
| | Signature | | | No |

It is to be understood that an embodiments disclosed herein provide the ability to use the serial number and its license-type attributes (which could be Retail, Volume, Tryout etc) in combination with consolidated licensing data found in the License Configuration file, such as in the format shown above, to provide consolidation of a myriad of licensing data including specific selections of the user (licensing type, server location), usage of the product as trial or retail/volume, etc.). This information is used in combination with the serial number and its attributes for the single binary solution to work with different licensing types. In the above example, Yes/No means if contents were signed with digital signature (i.e. Signature element exists) than the content can not be edited. In step 208, the software 150 (or a tool associated with the software), under control of the administrator user 108 operating on distribution computer system 115, creates a distribution copy 170 for volume distribution and remote installation of the software 150 (bundled in package 170) on customer computer systems 165. The distribution copy or package 170 includes the software 150 to be installed on a customer computer system 165, the volume license configuration file 160-2 indicating a type of volume licensing to be applied to the software 150 (once installed), and the serial number associated with the software 150.

In sub-step 209, the software 150 receives a modification (e.g. via the administrator user 108 editing the file, or via automated detection of a local licensing server present in the customer network as shown in sub-steps 210 and 211) to the volume license configuration 160-2 to include or specify a network identity (e.g. a URL) of a customer-based local license server 162 that operates locally within a customer network 191 of a customer that purchased volume licenses for the software 150. The local license server 160 operates to provide authorization codes 197 (e.g. licenses) for operation of installations of software 150 operating on client computer systems 165 within the customer network 191. Modification of the volume license configuration 160-2 can be either manual (via an editor) or automated as explained in sub-steps 210 through 212. This modification can be made, for example, to the Sub-Element field ServerURL in the above example license configuration file format.

In sub-step 210, the software 150 (i.e., a tool that is distributed with the application to create the distribution packages 170) determines if the volume license configuration is associated with local licenses 197-1 that are to be distributed via a local license server. This is done in one configuration by examining the contents of the volume license configuration 160-2 that was downloaded by the administrator user 108 from the vendor web site 140 on the distribution computer system 115 (i.e. during creation of the distribution copy 170). If it is determined that local licenses 197-1 are to be used, steps 211 and 212 perform automated updating of the licensing configuration file 160-2 to indicate the network location of the local license server 162 (e.g. IP address, or URL).

In sub-step 211, during creation of the distribution package 170, an automated procedure (e.g. a process that is part of the software, or an administration tool) can be operated to automatically identify a network identity and location (e.g. a URL) of a local license server 162 operating with the customer network. This can be performed, for example, by sending a broadcast message onto the customer network seeking a response from any locally operated local license servers 162. A response received from a local license server 162 can indicate a URL of this server 162 that the automated procedure can then encode into the volume license configuration 160-2 during creation of the distribution copy 170.

In sub-step 212, the software 150 automatically modifies the volume license configuration 160-2 to include a reference to the automatically identified network identity and location of a local license server 162 operating with the customer network 191.

In other words, in one example configuration, during creation of the distribution copy 170, the software 150 operating on the distribution computer system 115 can automatically determine if the volume license configuration 160-2 (initially downloaded by the administrator 108 from the vendor server 110) is associated with (i.e. indicates) local licenses are to be distributed via a local license server 162, and if so, the system can automatically detect a local license server 162 operating in the customer network 191 and can automatically modify or edit the volume license configuration 160-2 (to be included in each distribution package 170) to reference this local license server 162 to obtain licenses (when the software operates). This avoids the administrator 108 from having to manually edit the volume license configuration file 160-2 to specify a URL of the local license server 162.

In sub-step 213, the software 150 (i.e., a tool that is distributed with the application to create the distribution packages 170) creates a distribution copy 170 for volume distribution and remote installation of the software 150 on customer computer systems 165. The distribution copy 170 includes the software 150 to be installed on a customer computer system 165, the volume license configuration file 160-2 indicating a type of volume licensing to be applied to the software (and indicating if the local licensing server 162 or the remote vendor licensing server 110 is to be used to obtain licenses), and the serial number 155.

In step 214, the software 150 (i.e., a tool that is distributed with the application to crate the distribution packages 170) distributes the distribution copy 170 to a plurality of customer computer systems 165 for installation in accordance with the volume licensing specified in the volume license configuration 160-2.

In step 215, the software 150 installs itself for operation in the computer system(s) 165 in accordance with a licensing determination made by the licensing server. This can including copying files to appropriate directories, creating folders and so forth.

In step 216, upon launch of the software, the software 150 communicates 192 with a licensing server (either local 162 or remote 110, based on the specified network location of the server 162 or 110 as indicated in the license configuration 160-2 or 160-1) for production of an authorization code 197 (i.e. a license token or other code) to allow operation of the software 150 on a computer system 165 or on a retail computer 101.

In sub-step 217, prior to communicating with the license server 110 or 162, the software 150 obtains a unique identity of the computer system 165 or 101 into which the software 150 is installed for operation. The unique identity represents or encodes a specific configuration of that computer system 101 or 165 and is different than unique identities of configurations of other computer systems into which the software 150 may also be installed. This allows the authorization code 197 to provide a license for the software that only allows the software 150 to operate on that specific computer system. One technique for producing this unique identity or fingerprint of the computer system is to utilize a computer system identity such as the host name or network address. More robust mechanisms for unique computer identification technology are available from companies such as Macrovision, Inc. of Santa Clara, Calif., USA.

In step 218, the software 150 transfers a request 192 containing the serial number 155, the unique identity of the computer system 193, and at least a portion of the license configuration 160 to the license server (either the remote vendor server 110, or the local customer server 162) specified in the license configuration 160-1 or 160-2 to obtain the authorization code 197. The authorization code 197 provides a license for operation of the software 150 (i.e. the application that is now installed) in the computer system 165 or 101 and indicates features of the software 150 to be enabled for operation.

In step 219, the executing software 150 receives the authorization code 197 from the licensing server 162 or 110. The authorization code 197 allows operation of the software on the computer system 165 or 101.

In this manner, the system described herein can provide a single binary of the application 150 and distribution and licensing can be carried out in a variety of different ways without having to track separate versions of the software 150.

Figure 5:
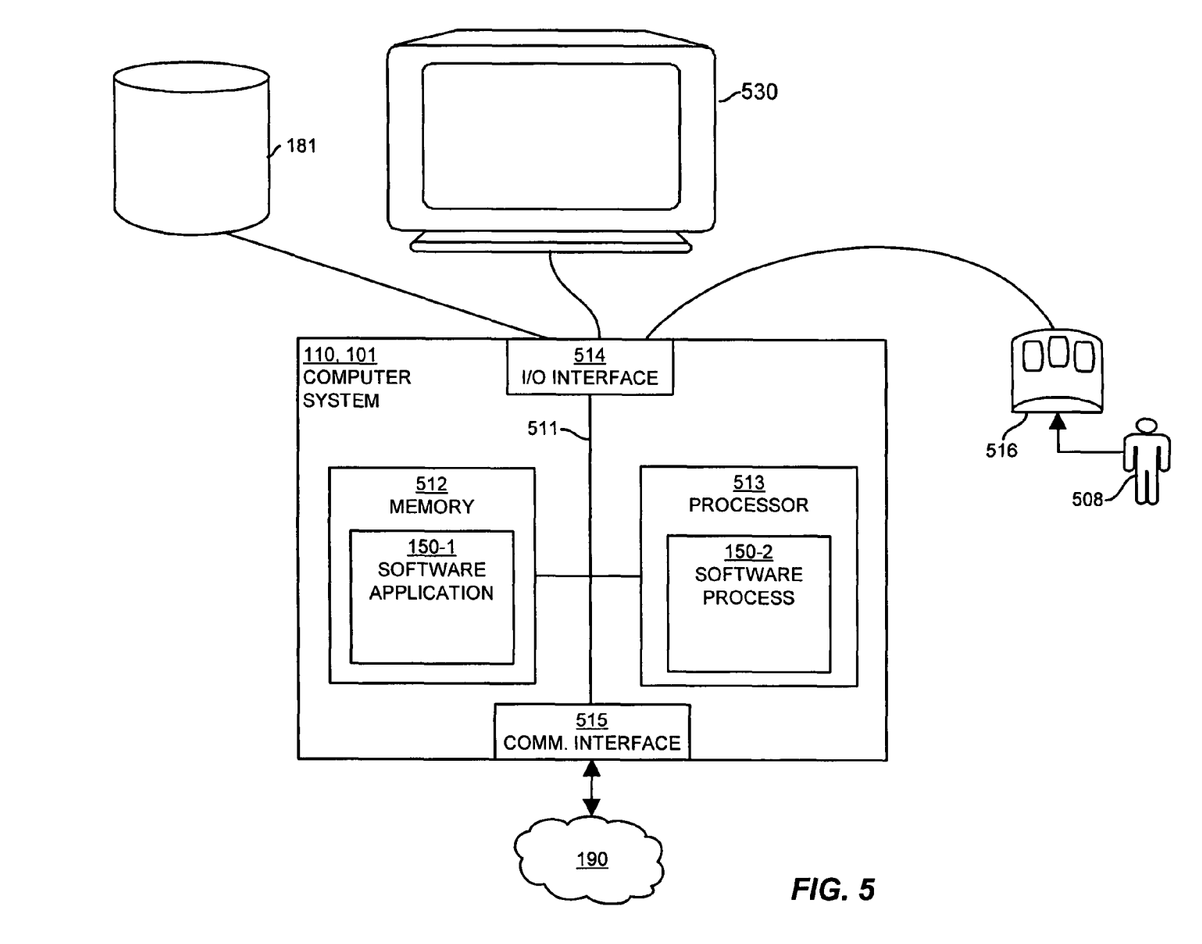
FIG. 5 is an example of a computer environment and corresponding computer system for executing a license distribution manager application according to embodiments herein.

FIG. 5 is a block diagram of a computer environment 100 illustrating an example architecture of a respective computer system 110 or 101 configured according to embodiments herein. The computer system can be a computerized device such as a personal computer, workstation, portable computing device, console, network terminal, processing device, network device, etc. and may operate in the volume setting or the retail setting as explained herein.

As shown, computer system 110, 101 of the present example includes an interconnect 511 that couples a memory system 512, a processor 513, I/O interface 514, and a communications interface 515. I/O interface 514 provides connectivity to peripheral devices 516 (if such devices are present) such as a keyboard, mouse (e.g., selection tool 116), display screens (e.g., display medium 530), etc. User 508 can provide input to computer system 110. Communications interface 515 enables computer system 110 to communicate over network 190 to retrieve and transmit information as previously discussed.

As shown, memory system 512 is encoded with a software application 150-1 (e.g. the application code and code for related processes, tools and data) that supports software license distribution as discussed above and as discussed further below. The software application 150-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the software application 150-1. Execution of the software application 150-1 produces processing functionality in the software process 150-2. In other words, the software process 150-2 represents one or more portions of the software application 150-1 performing within or upon the processor 513 in the computer system 110.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which a computer system initiates execution of software instructions stored in memory, the computer-implemented method comprising:
   receiving a serial number, the serial number associated with software;
   decoding the serial number to identify a license type associated with the software;
   obtaining a license configuration corresponding to the license type associated with the software;
   communicating with a licensing server based on the license configuration for production of an authorization code to allow operation of the software on a computerized device;
   receiving the authorization code from the licensing server, the authorization code allowing operation of the software on the computerized device;
   wherein receiving the serial number includes:
      the serial number having an encoded license type assigned to the software, the license type corresponding to specific features of the software to enable upon installation;
   wherein obtaining the license configuration includes:
      obtaining the license configuration from a single binary executable of the software stored locally, the single binary executable of the software being executable in accordance with multiple different license configurations corresponding to different software features enabled by a given license type;
      installing the single binary executable of the software for operation in the computerized device in accordance with a licensing determination made by the licensing sever, the licensing determination indicating which features of the single binary executable of the software to enable for use; and
      executing the single binary executable of the software in a conformance with the license type and features enabled by the authorization code.

2. The computer-implemented method of claim 1 wherein obtaining a license configuration corresponding to the license type associated with the software comprises:
   determining that the serial number identifies that the software is associated with a retail license type;
   in response to determining that the serial number identifies that the software is associated with a retail license type, obtaining a retail license configuration for use with the software; and
   wherein obtaining the retail license configuration for use with the software comprises:
      obtaining the retail license configuration locally from removable local storage media, the removable local storage media being inserted into a peripheral storage device, the peripheral storage device being locally installed and operating on the computerized device, the computerized device being a device onto which the software is to be operated, the local storage media further including a binary executable of the software to be installed, the retail license configuration specifying the licensing server, the licensing server being a vendor license server with which to communicate over a network for production of the authorization code.

3. The computer-implemented method of claim 1 wherein obtaining a license configuration corresponding to the license type associated with the software comprises:
   determining that the serial number identifies that the software is associated with a volume license type; and
   in response to determining that the serial number identifies that the software is associated with a volume license type, obtaining a volume license configuration for use with the software.

4. The computer-implemented method of claim 3 wherein obtaining a volume license configuration for use with the software comprises:
   obtaining a volume license configuration that indicates licenses for the software are at least one of:
   local volume licenses that are served from a local license server operating within a private network of a customer that purchased volume licenses for the software;
   remote volume licenses that are served from a public license server operating within a public network;
   special volume licenses that do not require the software to communicate with a license server to allow operation of the software.

5. The computer-implemented method of claim 3 wherein obtaining a volume license configuration for use with the software comprises:
   communicating, over a network, with a licensing portal associated with the vendor of the software to download a volume license configuration for use with the software, the volume license configuration identifying that the software is associated with at least one type of volume license.

6. The computer-implemented method of claim 3 wherein obtaining a license configuration corresponding to the license type associated with the software comprises:
   receiving a modification to the volume license configuration to include a network identity of a junior license server that operates locally within a customer network of a customer that purchased volume licenses for the software, the junior license server providing authorization codes for operation of installations of software operating within the customer network; and
   wherein receiving a modification to the volume license configuration comprises:
      determining that the volume license configuration is associated with local licenses that are to be distributed via the junior license server;
      automatically identifying a network identity and location of the junior license server operating within the customer network; and
      automatically modifying the volume license configuration to include a reference to the automatically identified network identity and location of the junior license server operating with the customer network.

7. The computer-implemented method of claim 6 wherein receiving a modification to the volume license configuration comprises:
    determining that the volume license configuration is associated with local licenses that are to be distributed via the junior license server;
    automatically identifying a network identity and location of the junior license server operating within the customer network; and
    automatically modifying the volume license configuration to include a reference to the automatically identified network identity and location of the junior license server operating with the customer network.

8. The computer-implemented method of claim 5 comprising:
    creating a distribution copy for volume distribution and remote installation of the software on customer computerized devices, the distribution copy including the software to be installed on a customer computerized device, the volume license configuration file indicating a type of volume licensing to be applied to the software, and the serial number; and
    distributing the distribution copy to a plurality of customer computerized device for installation in accordance with the volume licensing specified in the volume license configuration.

9. The computer-implemented method of claim 1 comprising:
    installing the software for operation in the computerized device in accordance with a licensing determination made by the licensing server.

10. The computer-implemented method of claim 8 wherein communicating with a licensing server based on the license configuration for production of the authorization code to allow operation of the software on a computerized device comprises:
    obtaining a unique identity of the computerized device into which the software is installed for operation, wherein the unique identity is specific to a configuration of that computerized device and is different than unique identities of configurations of other computerized devices into which the software is installed; and
    transferring the serial number, the unique identity of the computerized device, and at least a portion of the license configuration to the vendor license server specified in the license configuration to obtain the authorization code, the authorization code providing a license for operation of the software in the computerized device and indicating features of the software to be enabled for operation.

11. The computer-implemented method of claim 9 comprising:
    operating the software in a conformance with a license and features identified by the authorization code.

12. A non-transitory computer-readable storage medium having instructions stored thereon for processing data information, such that the instructions, when carried out by a processing device, cause the processing device to perform the operations of:
    receiving a serial number, the serial number associated with software;
    decoding the serial number to identify a license type associated with the software;
    obtaining a license configuration corresponding to the license type associated with the software;
    communicating with a licensing server based on the license configuration for production of an authorization code to allow operation of the software on a computerized device;
    receiving the authorization code from the licensing server, the authorization code allowing operation of the software on the computerized device;
    wherein receiving the serial number includes:
        the serial number having an encoded license type assigned to the software, the license type corresponding to specific features of the software to enable upon installation;
    wherein obtaining the license configuration includes:
        obtaining the license configuration from a single binary executable of the software stored locally, the single binary executable of the software being executable in accordance with multiple different license configurations corresponding to different software features enabled by a given license type;
    installing the single binary executable of the software for operation in the computerized device in accordance with a licensing determination made by the licensing sever, the licensing determination indicating which features of the single binary executable of the software to enable for use; and
    executing the single binary executable of the software in a conformance with the license type and features enabled by the authorization code.

13. The computer-readable storage medium of claim 12 wherein obtaining a license configuration corresponding to the license type associated with the software comprises:
    determining that the serial number identifies that the software is associated with a retail license type;
    in response to determining that the serial number identifies that the software is associated with a retail license type, obtaining a retail license configuration for use with the software; and
    obtaining a retail license configuration for use with the software comprises:
        obtaining the retail license configuration locally from removable local storage media, the removable local storage media being inserted into a peripheral storage device, the peripheral storage device being locally installed and operating on computerized device, the computerized device being a device onto which the software to be operated, the local storage media further including a binary executable of the software to be installed, the retail license configuration specifying the licensing server, the licensing server being a vendor license server with which to communicate over a network for production of the authorization code.

14. The computer-readable storage medium of claim 12 wherein obtaining a license configuration corresponding to the license type associated with the software comprises:
    determining that the serial number identifies that the software is associated with a volume license type; and
    in response to determining that the serial number identifies that the software is associated with a volume license type, obtaining a volume license configuration for use with the software.

15. The computer-readable storage medium of claim 14 wherein obtaining a volume license configuration for use with the software comprises:
    obtaining a volume license configuration that indicates licenses for the software are at least one of:

local volume licenses that are served from a local license server operating within a private network of a customer that purchased volume licenses for the software;

remote volume licenses that are served from a public license server operating within a public network; and special volume licenses that do not require the software to communicate with a license server to allow operation of the software.

16. The computer-readable storage medium of claim 14 wherein obtaining a volume license configuration for use with the software comprises:

communicating, over a network, with a licensing portal associated with the vendor of the software to download a volume license configuration for use with the software, the volume license configuration identifying that the software is associated with at least one type of volume license.

17. The computer-readable storage medium of claim 14 wherein obtaining a license configuration corresponding to the license type associated with the software comprising:

receiving a modification to the volume license configuration to include a network identity of a junior license server that operates locally within a customer network of a customer that purchased volume licenses for the software, the junior license server providing authorization codes for operation of installations of software operating within the customer network; and wherein receiving a modification to the volume license configuration comprises:

determining that the volume license configuration is associated with local licenses that are to be distributed via the junior license server automatically identifying a network identity and location of the junior license server operating with the customer network; and automatically modifying the volume license configuration to include a reference to the automatically identified network identity and location of the junior license server operating with the customer network.

18. The computer-readable storage medium of claim 16 comprising:

creating a distribution copy for volume distribution and remote installation of the software on customer computerized devices, the distribution copy including the software to be installed on a customer computerized device, the volume license configuration file indicating a type of volume licensing to be applied to the software, and the serial number; and distributing the distribution copy to a plurality of customer computerized device for installation in accordance with the volume licensing specified in the volume license configuration.

19. The computer-readable storage medium of claim 12 comprising:

installing the software for operation in the computerized device in accordance with a licensing determination made by the licensing server.

20. The computer-readable storage medium of claim 19 wherein communicating with a licensing server based on the license configuration for production of the authorization code to allow operation of the software on a computerized device comprises:

creating a unique identity of the computerized device into which the software is installed for operation, wherein the unique identity is specific to a configuration of that computerized device and is different than unique identities of configurations of other computerized devices into which the software is installed; and transferring the serial number, the unique identity of the computerized device, and at least a portion of the license configuration to the vendor license server specified in the license configuration to obtain the authorization code, the authorization code providing a license for operation of the software in the computerized device and indicating features of the software to be enabled for operation.

21. The computer-readable storage medium of claim 19 comprising:

operating the software in a conformance with a license and features identified by the authorization code.

22. A computerized device comprising:

a processor;

a communications interface;

a memory unit that stores instructions associated with an application executed by the processor; and an interconnect coupling the processor, the memory unit and the communications interface, the instructions when executed by the processor cause the computerized device to perform operations of:

receiving a serial number, the serial number associated with software, the software to be installed on the computer system;

decoding the serial number to identify a license type associated with the software;

obtaining a license configuration corresponding to the license type associated with the software;

communicating, via the communications interface, with a licensing server based on the license configuration for production of an authorization code to allow operation of the software on a computerized device;

receiving, via the communications interface, the authorization code from the licensing server, the authorization code allowing operation of the software on the computerized device;

wherein receiving the serial number includes:

the serial number having an encoded license type assigned to the software, the license type corresponding to specific features of the software to enable upon installation;

wherein obtaining the license configuration includes:

obtaining the license configuration from a single binary executable of the software stored locally, the single binary executable of the software being executable in accordance with multiple different license configurations corresponding to different software features enabled by a given license type;

installing the single binary executable of the software for operation in the computerized device in accordance with a licensing determination made by the licensing sever, the licensing determination indicating which features of the single binary executable of the software to enable for use; and executing the single binary executable of the software in a conformance with the license type and features enabled by the authorization code.

23. The computer-implemented method of claim 1, further comprising:

providing one common serial number encoded with a trial license type and pre-installed, the common serial number corresponding to limited functionality and limited features of the software, the single binary executable of the software including the trial license type.

24. The computer-implemented method of claim 23, further comprising:
   converting the trial license to a perpetual license through a purchase transaction executed within the software.

25. The computer-implemented method of claim 1, further comprising:
   determining that the serial number identifies that the single binary executable of the software is associated with a retail license type, and, in response, configuring the single binary executable of the software for a retail license operation to enable the single binary executable of the software to execute in accordance with the retail license type; and
   determining that the serial number identifies that the single binary executable of the software is associated with a volume license type, and, in response, configuring the single binary executable of the software for a volume license operation to enable the single binary executable of the software to execute in accordance with the retail license type.

26. The computer-implemented method of claim 1, further comprising:
   receiving a request for a license, the license associated with the software, the request including:
      a unique identity of a computerized device into which the single binary executable of the software is installed for operation, wherein the unique identity is specific to a configuration of that computerized device and is different than unique identities of configurations of other computerized devices into which the single binary executable of the software is installed;
      a serial number associated with the software requesting the license;
      at least a portion of a license configuration associated with the software, the at least a portion of the license configuration identifying the single binary executable of the software installed for operation;
   processing the request for the license to produce the authorization code for operation of the single binary executable of the software in the computerized device having the unique identity, the authorization code providing a license for operation of the single binary executable of the software in the computerized device and indicating features of the single binary executable of the software to be enabled for operation; and
   returning the authorization code to the source of the request for the license for the software.

27. The computer-readable storage medium of claim 12, wherein the storage medium includes a single binary executable of the software, the single binary executable of the software executing multiple license configurations that correspond to software features of the single binary executable of the software provided for a given license type, wherein the single binary executable of the software operates the software features differently for each license configuration.

28. The computer-readable storage medium of claim 27, wherein the single binary includes a same binary executable image for multiple versions of the software, the multiple versions of the software including at least one retail version and at least one professional version, the single binary executing differently according to a combination of the serial number and the license configuration.

29. The computer-readable storage medium of claim 28, further comprising:
   wherein receiving the serial number includes:
      the serial number having an encoded license type assigned to the software, the license type corresponding to specific features of the software to enable upon installation;
   wherein obtaining the license configuration includes:
      obtaining the license configuration from a single binary executable of the software stored locally, the single binary executable of the software being executable in accordance with multiple different license configurations, wherein each different license configuration corresponds to different software features enabled by a given corresponding license type;
   installing the single binary executable of the software for operation in the computerized device in accordance with a licensing determination made by the licensing sever, the licensing determination indicating which features of the single binary executable of the software to enable for use; and
   executing the single binary executable of the software in a conformance with the license type and features enabled by the authorization code.

30. The computer-readable storage medium of claim 29
   determining that the serial number identifies that the single binary executable of the software is associated with a retail license type, and, in response, configuring the single binary executable of the software for a retail license operation to enable the single binary executable of the software to execute in accordance with the retail license type; and
   determining that the serial number identifies that the single binary executable of the software is associated with a volume license type, and, in response, configuring the single binary executable of the software for a volume license operation to enable the single binary executable of the software to execute in accordance with the retail license type.

31. The computer-implemented method of claim 25, wherein the single binary includes a same binary executable image for multiple versions of the software, the multiple versions of the software including at least one retail version and at least one professional version, the single binary executing differently according to a combination of the serial number and the license configuration.

* * * * *

UNITED STATES PATENT AND TRADEMARK OFFICE
CERTIFICATE OF CORRECTION

| | | |
|---|---|---|
| PATENT NO. | : 7,831,517 B1 | Page 1 of 1 |
| APPLICATION NO. | : 11/585715 | |
| DATED | : November 9, 2010 | |
| INVENTOR(S) | : Shayam Sunder Vijay | |

It is certified that error appears in the above-identified patent and that said Letters Patent is hereby corrected as shown below:

Col. 15 claim 1, line 31
Delete "sever" and insert --server-- in place thereof

Col. 18 claim 12, line 33
Delete "sever" and insert --server-- in place thereof

Col. 20 claim 22, line 40
Delete "sever" and insert --server-- in place thereof

Col. 22 claim 29, line 18
Delete "sever" and insert --server-- in place thereof

Signed and Sealed this
Twenty-fifth Day of January, 2011

David J. Kappos
*Director of the United States Patent and Trademark Office*